United States Patent [19]

Henderson et al.

[11] 3,996,813
[45] Dec. 14, 1976

[54] ENDLESS POWER TRANSMISSION BELT

[75] Inventors: Dewey D. Henderson; Jack D. White, Jr., both of Springfield, Mo.

[73] Assignee: Dayco Corporation, Dayton, Ohio

[22] Filed: Feb. 13, 1976

[21] Appl. No.: 657,911

[52] U.S. Cl. .................................. 74/233; 74/234
[51] Int. Cl.² ...................... F16G 5/16; F16G 5/00
[58] Field of Search ............ 74/231 R, 231 P, 233, 74/234

[56] References Cited
UNITED STATES PATENTS

| | | | |
|---|---|---|---|
| 2,802,511 | 8/1957 | Waugh | 74/231 R X |
| 3,564,933 | 2/1971 | Clinkenbeard | 74/233 |
| 3,621,727 | 11/1971 | Cicognani | 74/231 P |
| 3,853,017 | 12/1974 | White, Jr. et al. | 74/234 |
| 3,951,006 | 4/1976 | Fisher et al. | 74/233 |

Primary Examiner—Leonard H. Gerin
Attorney, Agent, or Firm—Reuben Wolk

[57] ABSTRACT

An endless power transmission belt for operation in an endless path is provided and comprises a plurality of laterally spaced belt elements and a tie band interconnecting the belt elements. The tie band comprises a plurality of cooperating layers with one of the layers comprising a plurality of tensile members arranged in spaced substantially parallel relation along the endless path and with each of the tensile members extending across the entire transverse dimension of the tie band; and, the tensile members provide the strength for holding the belt elements in spaced relation. Another of the layers of the plurality of layers of the tie band is in the form of at least one fabric layer which improves the overall structural integrity of the tie band.

20 Claims, 3 Drawing Figures

U.S. Patent  Dec. 14, 1976  3,996,813
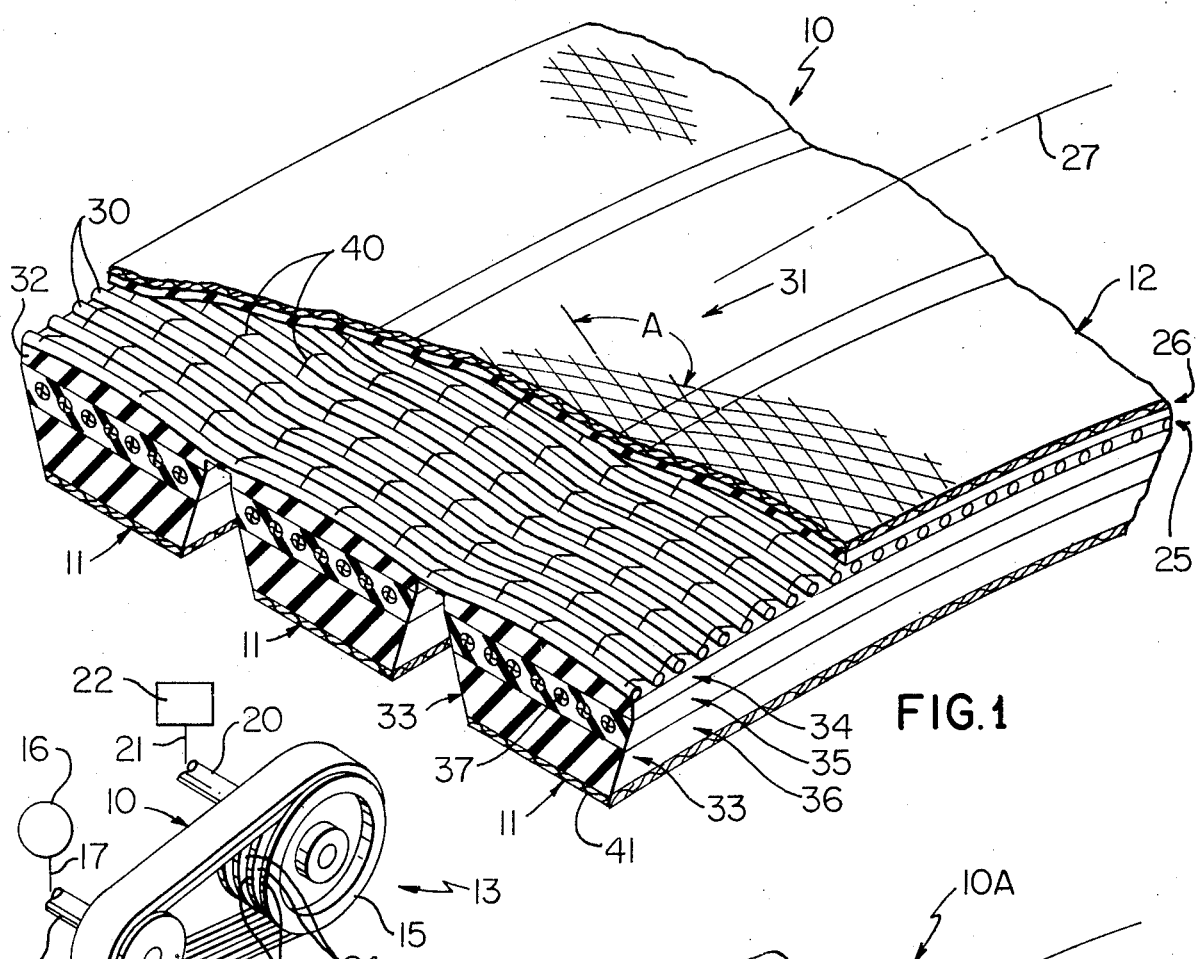
FIG. 1
FIG. 3
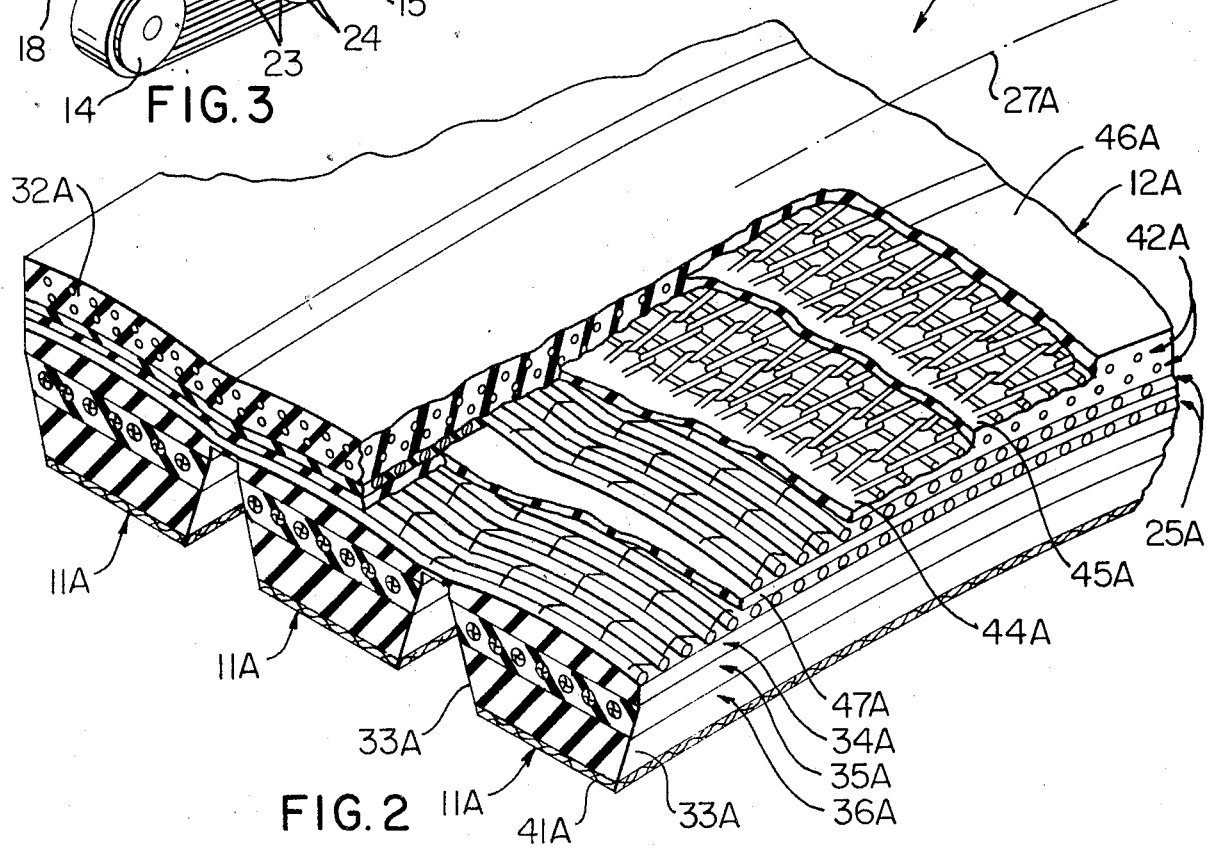
FIG. 2

3,996,813

ENDLESS POWER TRANSMISSION BELT

BACKGROUND OF THE INVENTION

So-called banded endless power transmission belts made primarily of elastomeric material and comprised of a plurality of belt elements banded together with a tie band are known in the art. A common problem with known banded belts is that they tend to fail rapidly once subjected to adverse conditions caused by operation thereof under excessive loads or by operation thereof in excessively worn sheaves. To overcome this problem the construction of the tie band should be such that it holds its associated belt elements together in a high strength manner preventing shearing of the tie band as well as preventing cracking or delamination thereof.

SUMMARY

It is a feature of this invention to provide an endless power transmission belt for operation in an endless path which is comprised of a plurality of laterally spaced belt elements and an improved tie band interconnecting the belt elements.

Another feature of this invention is the provision of an endless power transmission belt of the character mentioned wherein the belt and tie band are made primarily of elastomeric material and the tie band is comprised of a plurality of layers.

Another feature of this invention is the provision of an endless power transmission belt for operation in an endless path which is comprised of a plurality of laterally spaced belt elements and a tie band interconnecting the belt elements with the tie band comprising a plurality of cooperating layers with at least one of the layers comprising a plurality of tensile members arranged in spaced substantially parallel relation along the endless path and with each of the tensile members extending across the entire transverse dimension of the tie band and the tensile members providing the strength for holding the belt elements in spaced relation. Another of the layers of the tie band comprises at least one fabric layer which improves the overall structural integrity of the tie band and thus of its belt.

Another feature of this invention is the provision of an endless power transmission belt of the character mentioned which employs a so-called stress-relieved fabric layer.

Another feature of this invention is the provision of an endless power transmission belt of the character mentioned which employs a knitted fabric layer.

Accordingly, it is an object of this invention to provide an improved endless power transmission belt having one or more of the novel features set forth above, or hereinafter shown or described.

Other details, features, objects, uses, and advantages of this invention will become apparent from the embodiments thereof presented in the following specification, claims, and drawing.

BRIEF DESCRIPTION OF THE DRAWING

The accompanying drawing shows present preferred embodiments of this invention, in which FIG. 1 is a perspective view with parts in cross-section, parts in elevation, and parts broken away illustrating one exemplary embodiment of the belt of this invention;

FIG. 2 is a view similar to FIG. 1 illustrating another exemplary embodiment of the belt of this invention; and FIG. 3 is a perspective view of the belt of FIG. 1 installed in associated sheaves comprising a drive system.

DESCRIPTION OF ILLUSTRATED EMBODIMENTS

Reference is now made to FIG. 1 of the drawing which illustrates one exemplary embodiment of a so-called banded endless power transmission belt of this invention which is designated generally by the reference numeral 10. The belt 10 is made primarily of elastomeric material and comprises a plurality of laterally spaced belt elements each designated generally by the reference numeral 11 and a tie band which is designated generally by the reference numeral 12. The tie band 12 is constructed to assure that the belt elements 11 are held together in a high strength manner under adverse conditions of very high or excessive belt loading and under conditions where the belt is used in worn sheaves.

As seen in FIG. 3, the belt 10 is adapted to be operated in a drive system which is designated generally by the reference numeral 13 and such belt engages a driving sheave 14 and a driven sheave 15 with the driving sheave 14 having a drive shaft 18 which is operatively connected to a drive motor 16 by a mechanical connection 17. The driven sheave 15 has a shaft 20 extending therefrom which is in turn connected by a connection 21 to a schematically shown mechanical apparatus 22 which is to be driven by the motor 16 through the use of the drive system 13 and the power transmission belt 10. The belt 10 due to the unique character of its tie band 12 is particularly adapted to operate under conditions where the load imposed by the apparatus 22 is excessive or opposed walls 23 defining each sheave groove 24 of sheaves 14 and 15 become excessively worn.

Referring again to FIG. 1 the tie band 12 comprises a plurality of cooperating layers shown as an inner layer 25 and an outer layer 26 of woven fabric. The layer 25, in this example, is comprised of a plurality of tensile members a representative few of which are designated by the same reference numeral 30 and such members are arranged in spaced substantially parallel relation along and transverse the endless path of the belt with such endless path being designated by the reference numeral 27. The tensile members 30 of this example preferably extend perpendicular to the endless path 27 and thus may be considered as extending perpendicular to the longitudinal axis of the belt 10.

Each of the members 30 extends across the entire transverse dimension of the tie band 12 and hence across the entire transverse dimension of the belt 10, and, such tensile members 30 provide the strength for holding the belt elements 11 in spaced relation assuring that each element 11 remains in the grooves of sheaves associated therewith with minimum liklihood that compressive or tensile forces exerted against each element transverse the endless path of the belt will cause failure of the members 30 in the tie band.

The plurality of cooperating layers forming the tie band 12 include the woven fabric layer 26 which has warps and wefts thereof arranged at an angle A to the endless path 27 of the belt and hence at the angle A to its longitudinal axis and as shown at 31. The fabric layer 26 may be so-called stress-relieved fabric which is known in the art and the layer 26 improves the overall structural integrity of the tie band 12 and in this example defines the outside surface thereof. Further, the warps and wefts defining the fabric layer 26 are disposed transverse the longitudinal axis 27 and the angle A therebetween may range between 95 and 155 degrees as shown at 31.

The tie band 12 is made of a suitable elastomeric matrix material 32 and in this example of the invention such elastomeric material is shown in the drawings as rubber. which may be any suitable natural rubber compound or synthetic rubber compound used in the art for making power transmission belts; and, it will be seen that the layers 25 and 26 are basically embedded in the elastomeric matrix material 32 with the layer 26 of this example having its lower surface portion embedded in the elastomeric matrix material 32. The matrix material 32 surrounds each of the tensile members 30 and assures that such members are not individually loosened, delaminated, or stripped from the tie band 12 and hence the belt 10.

Referring again to FIG. 1 it will be seen that each of the belt elements 11 has a substantially trapezoidal cross-sectional configuration which includes opposed raw-edged non-parallel sides 33; and, each element 11 is comprised of a tension section 34, a load-carrying section 35, and a compression section 36. It will be seen that the tie band 12 binds the elements 11 together by bonding such elements adjacent to the tension sections 34 thereof. It will also be seen that each belt element 11 has its individual load-carrying section defined by a helically wound load-carrying cord 37.

The tensile members 30 of the tie band 12 are preferably in the form of cords and it will be seen that the layer 25 further comprises a plurality of comparatively weak tie strands 40 which are arranged in spaced substantially parallel relation along the endless path 27 and the strands 40 hold the cords 30 in substantially parallel relation. The cords 30 may comprise the strength cords of a so-called cord fabric which is often referred to in the art as "tire cord" and such tire cord has the comparatively weak tie strands 40 holding the strength cords substantially parallel.

The belt 10 has its woven layer 26 defining the top outside surface thereof and the woven layer is in the form of a fabric layer and preferably has elastomeric material such as rubber frictioned or skimmed on its outside surface. It will also be appreciated that each of the belt elements may have a cover preferably in the form of a woven fabric cover 41 defining its inside surface. Further, although the sides 33 of each belt element 11 have been described as raw-edged sides it will be appreciated that such sides 33 may be covered with fabric, or the like.

Another exemplary embodiment of this invention is illustrated in FIG. 2 of the drawing. The belt illustrated in FIG. 2 is similar to the belt 10 and therefore such belt will be designated by the reference numeral 10A and representative parts of the belt 10A which are similar to corresponding parts of the belt 10 will be designated in the drawing by the same reference numeral as in the belt 10 (whether or not such parts are mentioned in the specification) followed by the letter designation A and not described again in detail. Only those component parts of the belt 10A which are different from corresponding parts of the belt 10 will be designated by a new reference numeral also followed by the letter designation A and described in detail.

The main difference between the belt 10 and the belt 10A is that belt 10A instead of having a plurality of two layers comprising its tie band 12A has a plurality of four layers shown as a pair of inner 25A and a pair of outer layers in the form of knitted fabric layers 42A. Each of the layers 42A may be made of any suitable material utilized in making knitted fabrics; and, it will be appreciated each knitted fabric layer 42A may be of a so-called non-run type knitted fabric. Further, the belt 10A may be used interchangeably with the belt 10 in any drive system including system 13.

The inner knitted layer 42A has a thickness 44A of elastomeric matrix material 32A between it and the more closely adjacent layer 25A, a thickness 45A of elastomeric matrix material is provided between the two knitted layers 42A, and a top thickness 46A of elastomeric material is provided on the outermost knitted layer 42A.

It will also be seen that a thickness 47A of elastomeric matrix material 32A is provided between the layers 25A of tensile cords 30A.

The belts 10 and 10A are made using any suitable apparatus, method, and production technique known in the art. Further, although each belt is shown cross-hatched in the drawing as being made of rubber, it will be appreciated that each belt may be made of any suitable elastomeric material such as all types of synthetic plastic materials used in the art.

The tensile members 30 and 30A used in the belts 10 and 10A may be in the form of cords. For example, 1000 denier 2 ply twisted fabric cords spaced 32 per inch have been proposed in some applications.

In this disclosure of the invention, each of the belts 10 and 10A is shown as having a plurality of three belt elements; however, it will be appreciated that any desired number of belt elements may be utilized in each of the belts.

While present exemplary embodiments of this invention, and methods of practicing the same, have been illustrated and described, it will be recognized that this invention may be otherwise variously embodied and practiced within the scope of the following claims.

What is claimed is:

1. An endless power transmission belt for operating in an endless path comprising a plurality of laterally spaced belt elements and a tie band interconnecting said belt elements, said tie band comprising a plurality of cooperating layers, one of said layers comprising a plurality of tensile members arranged in spaced substantially parallel relation along said endless path with each of said tensile members extending across the entire transverse dimension of said tie band and said tensile members providing the strength for holding said belt elements in spaced relation, and another of said layers comprising a fabric layer which improves the overall structural integrity of said tie band.

2. A belt as set forth in claim 1 in which said tie band is made of elastomeric material having said plurality of layers embedded therein and said fabric layer prevents cracking of said elastomeric material and stripping of said tensile members.

3. A belt as set forth in claim 2 in which said tensile members are in the form of cords.

4. A belt as set forth in claim 2 in which said tensile members are in the form of cords and said one layer further comprising a plurality of comparatively weak tie strands holding said cords in said substantially parallel relation, said strands extending along said endless path.

5. A belt as set forth in claim 4 in which said warp cords are twisted cords.

6. A belt as set forth in claim 3 in which said fabric layer is a woven fabric layer having warps and wefts each disposed transverse said endless path with said warps and wefts being disposed at an angle ranging between 95 and 155 degrees with each other.

7. A belt as set forth in claim 3 in which said fabric layer is a knitted layer.

8. A belt as set forth in claim 3 in which said fabric layer defines the outside surface of said tie band and belt.

9. A belt as set forth in claim 3 in which each of said elements has a substantially trapezoidal cross-sectional configuration and is comprised of a tension section, a compression section, and a load-carrying section with said tie band binding said elements together by bonding each element adjacent the tension section thereof.

10. A belt as set forth in claim 3 in which each of said belt elements has a woven cover defining its inside surface.

11. A belt as set forth in claim 9 in which each of said belt elements has raw-edged non-parallel sides.

12. A belt as set forth in claim 3 in which said elastomeric material is a rubber compound.

13. A belt as set forth in claim 3 in which each of said cords is a twisted cord.

14. An endless power transmission belt for operation in an endless path comprising a plurality of laterally spaced belt elements and a tie band interconnecting said belt elements, said tie band comprising an elastomeric matrix material and a plurality of cooperating layers embedded in said elastomeric matrix material, said layers comprising, a plurality of layers of tensile members with the tensile members in each layer being arranged in spaced substantially parallel relation along said endless path with each of said tensile members extending across the entire transverse dimension of said tie band and said tensile members providing the strength for holding said belt elements in said spaced relation, and a plurality of layers of fabric, said fabric layers improving the overall structural integrity of said tie band.

15. A belt as set forth in claim 14 in which each of said elements has a substantially trapezoidal cross-sectional configuration and is comprised of a tension section, a compression section, and a load-carrying section with said tie band binding said elements together by bonding each element adjacent the tension section thereof.

16. A belt as set forth in claim 15 in which each of said belt elements has raw-edged non-parallel sides.

17. A belt as set forth in claim 15 in which said layers of tensile members are arranged in substantially parallel relation throughout the thickness of said tie band.

18. A belt as set forth in claim 15 in which said tensile members are in the form of cords arranged perpendicular to said endless path.

19. A belt as set forth in claim 15 in which at least one of said fabric layers is a knitted layer.

20. A belt as set forth in claim 18 in which said elastomeric matrix material is a rubber compound, said plurality of fabric layers are in the form of a plurality of knitted fabric layers, and each of said cords is a twisted cord.

* * * * *